(12) United States Patent
Fitzpatrick

(10) Patent No.: US 11,292,178 B2
(45) Date of Patent: *Apr. 5, 2022

(54) NOZZLE SHUT OFF FOR INJECTION MOLDING SYSTEM

(71) Applicant: EXTRUDE TO FILL, INC., Loveland, CO (US)

(72) Inventor: Richard Ernest Fitzpatrick, Loveland, CO (US)

(73) Assignee: Extrude to Fill, Inc., Loveland, CO (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/726,674

(22) Filed: Oct. 6, 2017

(65) Prior Publication Data

US 2018/0029262 A1 Feb. 1, 2018

Related U.S. Application Data

(63) Continuation of application No. 14/960,115, filed on Dec. 4, 2014, now Pat. No. 9,808,971.

(Continued)

(51) Int. Cl.
*B29C 48/92* (2019.01)
*B29C 45/50* (2006.01)
(Continued)

(52) U.S. Cl.
CPC .............. *B29C 48/92* (2019.02); *B29C 31/04* (2013.01); *B29C 45/03* (2013.01); *B29C 45/13* (2013.01);
(Continued)

(58) Field of Classification Search
CPC ... B29C 45/24; B29C 45/40; B29C 2948/924; B29C 2948/92409; B29C 48/694
See application file for complete search history.

(56) References Cited

U.S. PATENT DOCUMENTS

| 2,402,805 A | 6/1946 | Cousino |
| 2,471,813 A | 5/1949 | Cousino |

(Continued)

FOREIGN PATENT DOCUMENTS

| CN | 1033515 A | 6/1989 |
| CN | 1310664 A | 8/2001 |

(Continued)

OTHER PUBLICATIONS

International Bureau, "International Preliminary Report on Patentability", PCT Application No. PCT/US2015/064110 (Our Ref. P249081.WO.01), Feb. 3, 2017, 35 Pages.

(Continued)

*Primary Examiner* — Francisco W Tschen
*Assistant Examiner* — Elisa H Vera
(74) *Attorney, Agent, or Firm* — Dorsey & Whitney LLP

(57) ABSTRACT

An injection molding apparatus and method of fabricating a molded part are provided. The apparatus may include a barrel, a nozzle enclosing an end of the barrel and defining an opening in fluid communication with an inside of the barrel, and an extrusion screw positioned at least partially inside the barrel and rotatable relative to the barrel. The extrusion screw may include a screw tip. Relative axial movement between the barrel and the extrusion screw may open or close the opening of the nozzle to permit or prevent, respectively, material flow through the opening of the nozzle. The method may include clamping a mold, opening a nozzle, rotating the extrusion screw to pump a molten material into the mold until the mold is filled, closing the nozzle, and unclamping the mold to release a molded part.

20 Claims, 8 Drawing Sheets

Related U.S. Application Data

(60) Provisional application No. 62/087,414, filed on Dec. 4, 2014, provisional application No. 62/087,449, filed on Dec. 4, 2014, provisional application No. 62/087,480, filed on Dec. 4, 2014.

(51) Int. Cl.
| | | |
|---|---|---|
| *B29C 45/78* | (2006.01) | |
| *B29C 45/03* | (2006.01) | |
| *B29C 45/18* | (2006.01) | |
| *B29C 45/23* | (2006.01) | |
| *B29C 45/40* | (2006.01) | |
| *B29C 45/73* | (2006.01) | |
| *B29C 45/74* | (2006.01) | |
| *B29C 45/76* | (2006.01) | |
| *B29C 45/47* | (2006.01) | |
| *B29C 45/60* | (2006.01) | |
| *B29C 45/13* | (2006.01) | |
| *B29C 45/77* | (2006.01) | |
| *B29C 31/04* | (2006.01) | |
| *B29C 45/17* | (2006.01) | |
| *B29K 105/26* | (2006.01) | |
| *G05B 19/042* | (2006.01) | |
| *H02K 7/14* | (2006.01) | |

(52) U.S. Cl.
CPC ............. *B29C 45/18* (2013.01); *B29C 45/23* (2013.01); *B29C 45/40* (2013.01); *B29C 45/47* (2013.01); *B29C 45/5092* (2013.01); *B29C 45/60* (2013.01); *B29C 45/73* (2013.01); *B29C 45/74* (2013.01); *B29C 45/76* (2013.01); *B29C 45/77* (2013.01); *G05B 19/042* (2013.01); *H02K 7/14* (2013.01); *B29C 2045/1792* (2013.01); *B29C 2045/1875* (2013.01); *B29C 2045/5096* (2013.01); *B29C 2945/76006* (2013.01); *B29C 2945/76257* (2013.01); *B29C 2945/76381* (2013.01); *B29C 2945/76498* (2013.01); *B29C 2945/76665* (2013.01); *B29C 2945/76859* (2013.01); *B29C 2948/924* (2019.02); *B29K 2005/00* (2013.01); *B29K 2105/26* (2013.01); *B29K 2995/0008* (2013.01); *G05B 2219/2624* (2013.01)

(56) References Cited

U.S. PATENT DOCUMENTS

| | | | |
|---|---|---|---|
| 2,487,426 A | 11/1949 | Cousino | |
| 2,734,226 A | 2/1956 | Willert | |
| 2,885,734 A | 5/1959 | Roland | |
| 3,001,233 A | 9/1961 | Ernst | |
| 3,025,568 A | 3/1962 | Hardy | |
| 3,335,461 A | 8/1967 | Schwartz | |
| 3,337,909 A | 8/1967 | Adolf et al. | |
| 3,427,639 A | 2/1969 | Strauss | |
| 3,477,097 A | 11/1969 | Plymale | |
| 3,771,698 A | 11/1973 | Loichen | |
| 3,771,935 A | 11/1973 | Loichen | |
| 3,806,294 A | 4/1974 | Hehl | |
| 3,902,665 A | 9/1975 | Hendry | |
| 4,025,274 A | 5/1977 | Uemura et al. | |
| 4,077,760 A | 3/1978 | Sauer | |
| 4,154,536 A | 5/1979 | Sokolov | |
| 4,183,448 A | 1/1980 | Nash | |
| 4,311,446 A | 1/1982 | Hold et al. | |
| 4,699,581 A | 10/1987 | Nagasaka et al. | |
| 4,751,035 A | 6/1988 | McHenry et al. | |
| 4,867,938 A | 9/1989 | Schad et al. | |
| 5,013,231 A | 5/1991 | Fujita et al. | |
| 5,037,285 A | 8/1991 | Kudert et al. | |
| 5,040,589 A * | 8/1991 | Bradley | B22D 17/007 164/113 |
| 5,164,207 A * | 11/1992 | Durina | B29C 45/52 425/382.4 |
| 5,249,947 A | 10/1993 | Inaba et al. | |
| 5,363,747 A | 11/1994 | Clark et al. | |
| 6,059,556 A | 5/2000 | Koike | |
| 6,109,910 A | 8/2000 | Sekido | |
| 6,261,081 B1 | 7/2001 | Speck et al. | |
| 6,287,491 B1 | 9/2001 | Kilim et al. | |
| 6,345,976 B1 * | 2/2002 | Takayama | B29C 45/50 366/78 |
| 6,352,426 B1 | 3/2002 | Hutchinson et al. | |
| 6,368,095 B1 | 4/2002 | Chang | |
| 6,887,062 B1 | 5/2005 | Burg et al. | |
| 7,172,333 B2 | 2/2007 | Anderson et al. | |
| 7,249,940 B2 | 7/2007 | Senda et al. | |
| 7,291,297 B2 | 11/2007 | Weatherall et al. | |
| 7,431,583 B2 | 10/2008 | Takatsugi et al. | |
| 7,906,048 B2 | 3/2011 | Fitzpatrick | |
| 8,062,025 B2 | 11/2011 | Klobucar et al. | |
| 9,517,582 B2 * | 12/2016 | Fitzpatrick | B29C 45/77 |
| 9,623,593 B2 | 4/2017 | Fitzpatrick | |
| 9,808,971 B2 | 11/2017 | Fitzpatrick | |
| 9,931,773 B2 | 4/2018 | Fitzpatrick | |
| 10,086,550 B2 | 10/2018 | Fitzpatrick | |
| 2002/0084543 A1 | 7/2002 | Buja | |
| 2002/0170696 A1 | 11/2002 | Akers et al. | |
| 2003/0034577 A1 | 2/2003 | Seta et al. | |
| 2003/0075833 A1 | 4/2003 | Thomson | |
| 2003/0107154 A1 * | 6/2003 | Human | B29C 31/066 264/328.1 |
| 2004/0080064 A1 | 4/2004 | MacPhee et al. | |
| 2004/0119204 A1 | 6/2004 | Nishigaki | |
| 2004/0188001 A1 * | 9/2004 | Okuda | B29C 44/3461 156/78 |
| 2005/0161847 A1 | 7/2005 | Weatherall et al. | |
| 2006/0197254 A1 | 5/2006 | Onishi | |
| 2006/0134264 A1 | 6/2006 | Hahn | |
| 2006/0261521 A1 | 11/2006 | Beaumont | |
| 2007/0047380 A1 * | 3/2007 | Benjamin | B29C 48/08 366/81 |
| 2008/0099943 A1 | 5/2008 | Yamagiwa et al. | |
| 2008/0121497 A1 | 5/2008 | Esterson et al. | |
| 2009/0057300 A1 | 3/2009 | Taylor et al. | |
| 2009/0115086 A1 | 5/2009 | Manda | |
| 2009/0267253 A1 | 10/2009 | Fitzpatrick | |
| 2010/0072669 A1 | 3/2010 | Smith et al. | |
| 2010/0295199 A1 | 11/2010 | Zhang et al. | |
| 2012/0205219 A1 | 8/2012 | Nickerson et al. | |
| 2016/0158980 A1 | 6/2016 | Fitzpatrick | |
| 2016/0158981 A1 | 6/2016 | Fitzpatrick | |
| 2016/0158985 A1 | 6/2016 | Fitzpatrick | |
| 2016/0279851 A1 | 9/2016 | Fitzpatrick | |
| 2016/0279852 A1 | 9/2016 | Fitzpatrick | |
| 2016/0279854 A1 | 9/2016 | Fitzpatrick | |
| 2017/0217073 A1 | 8/2017 | Fitzpatrick | |

FOREIGN PATENT DOCUMENTS

| | | |
|---|---|---|
| CN | 101318368 A | 12/2008 |
| CN | 100448644 C | 1/2009 |
| CN | 201201318 Y | 3/2009 |
| CN | 100590039 C | 2/2010 |
| CN | 102802903 A | 11/2012 |
| CN | 103496086 A | 1/2014 |
| DE | 1270271 B | 6/1968 |
| DE | 2437248 A1 | 2/1976 |
| DE | 3711080 A1 | 10/1988 |
| DE | 4239776 A1 | 6/1994 |
| DE | 102005048787 A1 | 5/2006 |
| DE | 202007002954.3 U1 | 4/2007 |
| DE | 102007020612 A1 | 11/2008 |
| EP | 0057148 A2 | 8/1982 |
| EP | 2873505 A1 | 5/2015 |
| EP | 3227081 B1 | 10/2017 |
| EP | 3227078 B1 | 9/2019 |
| FR | 1276593 A | 11/1961 |

(56) References Cited

FOREIGN PATENT DOCUMENTS

| | | | |
|---|---|---|---|
| GB | 846724 A | 8/1960 | |
| GB | 953217 A | 3/1964 | |
| GB | 1199445 A | 7/1970 | |
| GB | 1359126 A | 7/1974 | |
| GB | 1492406 A | 11/1977 | |
| GB | 1513375 A | 6/1978 | |
| JP | S46-019824 | 7/1971 | |
| JP | S49-132271 | 3/1973 | |
| JP | S50-161555 | 6/1974 | |
| JP | S50159549 A | 12/1975 | |
| JP | S52-129764 A | 10/1977 | |
| JP | S53-097175 U | 8/1978 | |
| JP | S56-083021 | 11/1979 | |
| JP | S5889336 U | 5/1983 | |
| JP | 58209539 A | 12/1983 | |
| JP | S58209539 A | 12/1983 | |
| JP | 60024914 A | 2/1985 | |
| JP | 60096420 A * | 5/1985 | ......... B29C 45/1603 |
| JP | S61199919 A | 9/1986 | |
| JP | S62236714 A | 10/1987 | |
| JP | S63-113623 | 7/1988 | |
| JP | S63262219 A | 10/1988 | |
| JP | H01301215 A | 12/1989 | |
| JP | H0369327 | 3/1991 | |
| JP | H04151218 A | 5/1992 | |
| JP | H0524074 A | 2/1993 | |
| JP | H569457 | 3/1993 | |
| JP | 3283370 B2 | 12/1993 | |
| JP | H06226791 A | 8/1994 | |
| JP | H07214656 A | 8/1995 | |
| JP | H08264578 A | 10/1996 | |
| JP | 2000202876 A | 7/2000 | |
| JP | 2002-137271 A | 5/2002 | |
| JP | 2003-103589 A | 4/2003 | |
| JP | 2003297538 A | 10/2003 | |
| JP | 2004074803 A | 3/2004 | |
| JP | 2004243337 A | 9/2004 | |
| JP | 2005-028868 A | 2/2005 | |
| JP | 2005111757 A | 4/2005 | |
| JP | 2008-142954 A | 6/2008 | |
| JP | 2010-131966 A | 6/2010 | |
| JP | 2010131966 A | 6/2010 | |
| JP | 2014-030906 A | 2/2014 | |
| JP | 2020001183 A | 1/2020 | |
| TW | I251532 B | 3/2006 | |
| TW | 201414596 A | 4/2014 | |
| WO | 2004057918 A1 | 7/2004 | |
| WO | 2008058363 A1 | 5/2008 | |
| WO | 2016090274 A1 | 6/2016 | |
| WO | 2017013097 A1 | 1/2017 | |

OTHER PUBLICATIONS

International Bureau, "International Search Report and Written Opinion dated Apr. 11, 2016", PCT Patent Application No. PCT/US2015/064045 (Our Ref. P249080.WO.01), Apr. 11, 2016, 13 Pages.
International Bureau, "International Search Report and Written Opinion dated Mar. 30, 2016", PCT Patent Application No. PCT/US2015/064073 (Our Ref. P249082.WO.01), Mar. 30, 2016, 11 Pages.
International Bureau, "International Search Report and Written Opinion dated Feb. 5, 2016", PCT Patent Application No. PCT/US2015/064110 (Our Ref. P249081.WO.01), Feb. 5, 2016, 11 Pages.
RJG, "Sequential Valve Gate Control A New Opportunity For Productivity", www.rjginc.com/paperclip/articles/sequetial_valve.pdf, Mar. 2, 2004, 10 Pages.
"European Extended Search Report dated Sep. 2, 2018 for Application No. 15865229.7, 13 pages".
Plastics007, Vertical Injection Molding Machine (Single Slide) KR-D, Taiwan Kinki Machinery Co., 2011, 3 pages.
China National Intellectual Property Administration, "Office Action dated Dec. 3, 2019", Application No. 201680080350.0, 9 pages.
Intellectual Property India, "First Examination Report dated Dec. 17, 2019", Application No. 201817020827, 8 pages.
Reimker et al., "Intrusionsanlage Zum Aufarbeiten Gemischter Kunststoffe \Intrusion Plant for Reprocessing Mixed Plastics.", Kunststoffe, Carl Hanser Verlag, Munchen, Germany, vol. 83, No. 1, pp. 23-25, XP000330655, ISSN: 0023-5563, Abstract, 1993, 3 Pages.
Non-Final Office Action in Japanese patent application No. 2017-548373 dated Nov. 19, 2019, 17 pages.
Republic of Indonesia, Ministry of Law and Human Rights, "Office Action in App. No. P00201804036", dated Mar. 27, 2020.
Brazilian National Institute of Industrial Property, "Office Action From App. No. BR112017011755", dated Feb. 20, 2020.
Brazilian National Institute of Industrial Property, "Search Report For App No. 112017011636-7", dated Feb. 20, 2020 (6 Pages).
Intellectual Property India, "Examination Report For App. No. 201817020843", dated Mar. 20, 2020, (6 Pages).
Ministry of Law and Human Rights, Republic of Indonesia, "Office Action From App. No. PID201704162".
Intellectual Property India, "First Examination Report in App. No. 201717019405", dated Jul. 20, 2020.
Australian Intellectual Property Office, "Examination Report for AU Application No. 2019284022" dated Feb. 8, 2021.
Malaysian Patent Office, "Office Action for MY Patent App. No. PI 2017000836" dated Feb. 12, 2021.
Brazilian National Institute of Industrial Property, "Office Action in App. No. BR 112018011246-1", dated Mar. 6, 2020.
Brazilian National Institute of Industrial Property, "Office Action in App. No. BR 112018011253-4", dated Feb. 21, 2020 (4 pages).
European Patent Office, "Extended European Search Report issued in European Patent Application No. 20154123.2", dated Jun. 17, 2020 (7 pages).
Intellectual Property India, "First Examination Report in App. No. 201717019404", dated Sep. 28, 2020 (7 pages).
Mexican Patent Office, Office Action for MX Patent App. MX/a/2017/007307, dated Apr. 6, 2021.
State Intellectual Property Office of the People's Republic of China, Search Report for CN Appl. No. 201911169353.3, dated Apr. 28, 2021.
Korean Intellectual Property Office, Preliminary Rejection for KR Patent App. No. 10-2017-7017955, dated Mar. 6, 2021.
Intellectual Property Corporation of Malaysia, Search Report for MY App. No. PI 2018000847, daed May 11, 2021.
Extended European Search Report issued in European Patent Application No. 20189377.3 dated Jun. 24, 2021.
Examination Report issued in Australian Patent Application No. 2019284022 dated Aug. 24, 2021 (3 pages).
Office Action issued in Japanese Patent Application No. 2020-147182 dated Sep. 27, 2021 with Partial English-Language Translation (16 pages).

* cited by examiner

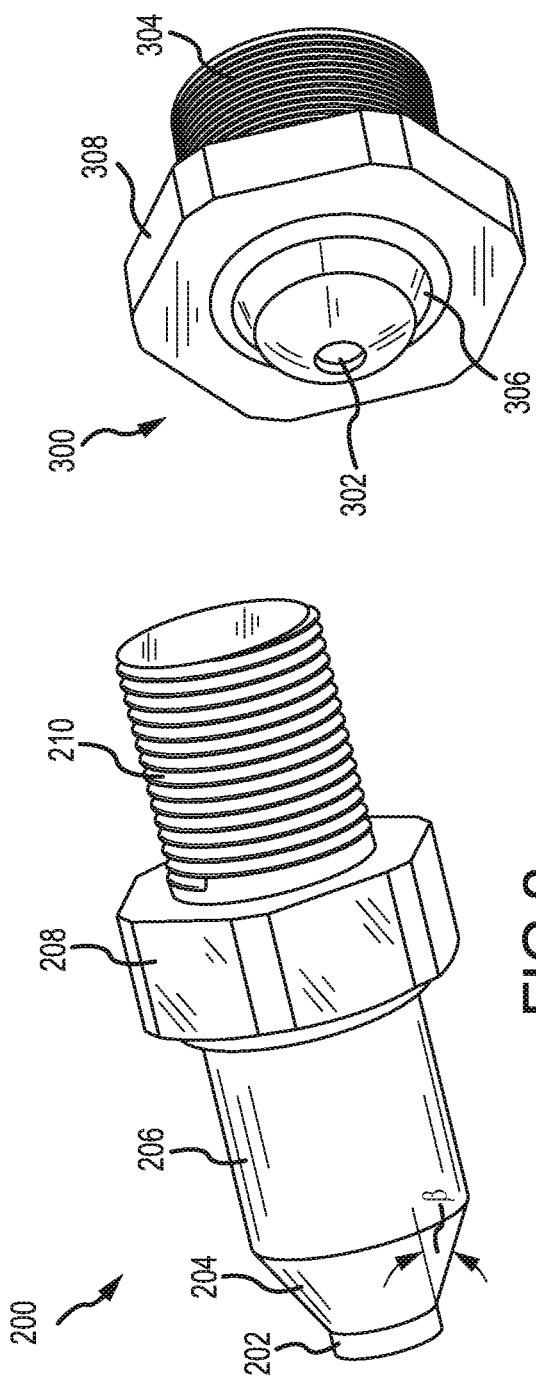
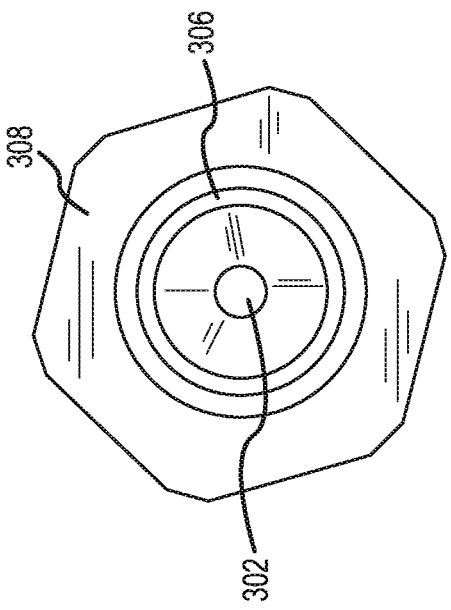
FIG.2
FIG.3A
FIG.3B

NOZZLE SHUT OFF FOR INJECTION MOLDING SYSTEM

CROSS-REFERENCES TO RELATED PATENT APPLICATIONS

This patent application is a continuation of U.S. patent application Ser. No. 14/960,115, entitled "Nozzle Shut Off for Injection Molding System", and filed on Dec. 4, 2015, which issued as U.S. Pat. No. 9,808,971 on Oct. 18, 2017, which claims the benefit under 35 U.S.C. 119(e) of U.S. Provisional Patent Application No. 62/087,414, entitled "Extrude-to-Fill Injection Molding and Extrusion Screw," and filed on Dec. 4, 2014, U.S. Provisional Patent Application No. 62/087,449, entitled "Nozzle Shut-off for Extrude-to-Fill Injection Molding System," and filed on Dec. 4, 2014, and U.S. Provisional Patent Application No. 62/087,480, entitled "Control System for Extrude-to-Fill Injection Molding," and filed on Dec. 4, 2014, each of which is hereby incorporated herein by reference in its entirety.

FIELD

The present disclosure is directed to an injection molding system. More specifically, the present disclosure is directed to an injection molding system including a nozzle closure apparatus. For example, the injection molding system may include an extrusion screw tip configured to shut off or close a nozzle.

BACKGROUND

A traditional injection molding system melts a material, such as a plastic, primarily by shear heat that is dynamically generated by rotation of a screw. The traditional injection molding system features a barrel with an opening at a hopper where plastic pellets enter the system and a nozzle where the plastic exits the barrel during injection. Between the hopper opening and the nozzle, the screw places pressure on the plastic resin to generate shear heat, bringing the plastic melt to the injection zone during a recovery extrusion stage of the molding cycle. This shear heat generation system relies on the formation of a cold slug in the nozzle to contain the plastic between each shot. The cold slug seals the nozzle after the injection cycle and prevents additional plastic from flowing out through the nozzle during the recovery extrusion stage that is between molding shots, trapping plastic in the barrel so that pressure can be applied to generate shear heat. However, the cold slug requires very high pressure to be dislodged to allow molten resin to flow out through the nozzle during the next injection cycle. The pressure applied to dislodge the cold slug is largely absorbed by the volume of plastic between the screw tip and the nozzle. Once the cold slug is dislodged, high pressure pushes the resin melt into a mold cavity through a mold gate (e.g., an entrance to the mold cavity) and runners or channels for delivering the melt into the mold cavity. It is common for a traditional injection molding system to have an injection pressure between 20,000 and 30,000 psi in order to obtain a pressure of 500-1500 psi in the mold cavity. Due to the high pressure, the traditional injection molding system typically includes a barrel having a heavy or thick wall section, which reduces the heat conduction to the plastic from the band heaters that surround the barrel. The cold slug causes one of the greatest inefficiencies for the traditional injection molding system.

Documents that may be related to the present disclosure in that they include various injection molding systems include U.S. Pat. Nos. 7,906,048, 7,172,333, 2,734,226, 4,154,536, 6,059,556, and 7,291,297. These proposals, however, may be improved.

There still remains a need to resolve the issues of the present injection molding systems to develop an automated and more efficient system that may provide additional flexibility for various applications.

BRIEF SUMMARY

The present disclosure generally provides an injection molding system, which may be referred to herein as an extrude-to-fill (ETF) injection molding apparatus, machine, or system. The injection molding system generally includes a nozzle closure apparatus. The nozzle closure apparatus may include a screw tip that opens and closes a nozzle. By using the screw tip to open and close the nozzle, the cold slug in the traditional injection molding system is eliminated, which allows the injection molding system to operate at a lower injection pressure. The lower injection pressure permits the thickness of the barrel to be reduced, which results in more effective conductive heating that contributes most of the heat needed for melting materials in the barrel.

In an embodiment, an extrude-to-fill injection molding apparatus is provided. The apparatus may include an extrusion screw inside a barrel, a nozzle having a tip portion configured to enclose the screw tip, a barrel connection configured to connect to the barrel, and a middle portion between the tip portion and the barrel connection. The tip portion of the nozzle may have an opening for injecting molding material. The apparatus may include a screw tip coupled to the extrusion screw. The screw tip may be configured to fit inside the tip portion of the nozzle to move along an axial direction inside the nozzle to seal and open the nozzle. The apparatus may include a hopper coupled to the barrel and configured to fill a material into the barrel, and one or more heaters placed outside the barrel.

In an embodiment, a method is provided for fabricating a plastic component by an extrude-to-fill injection molding apparatus which may include a hopper, an extrusion screw with a screw tip, a nozzle, one or more heaters, and a motor. The method may include clamping a mold and activating the motor to rotate the extrusion screw to move the screw tip away from the nozzle, which opens the nozzle. The method may include rotating the extrusion screw to pump a molten material into the mold until the mold is filled. The method may include reversing rotation of the extrusion screw to move the screw tip to close the nozzle, and cooling the mold to solidify the molten material in the mold. The method may include unclamping the mold to release a molded part.

In some embodiments, the screw tip may be a separate component from the extrusion screw. In some embodiments, the screw tip may be integrated with the extrusion screw.

In some embodiments, a nozzle may be a component affixed to the barrel. In some embodiments, the nozzle may be integrated into the injection mold and referred to herein as a nozzle insert.

In an embodiment, an injection molding apparatus is provided. The injection molding apparatus may include a barrel, a nozzle attached to the barrel and defining an opening in fluid communication with an inside of the barrel, and an extrusion screw positioned at least partially inside the barrel and rotatable relative to the barrel. The extrusion screw may include a screw tip. Relative axial movement between the barrel and the extrusion screw may open or close the opening of the nozzle to permit or prevent, respectively, material flow through the opening of the nozzle.

In an embodiment, a method of fabricating a molded part is provided. The method may include clamping a mold, opening a nozzle by separating a tip of an extrusion screw from an opening formed in the nozzle, rotating the extrusion screw to pump a molten material into the mold until the mold is filled, closing the nozzle by positioning the tip of the extrusion screw in sealed engagement with the nozzle, and unclamping the mold to release the molded part.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

The present disclosure is provided to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 2 is a perspective view of a screw tip of an ETF injection molding system in accordance with embodiments of the present disclosure.

FIG. 3A is a front perspective view of a nozzle in accordance with embodiments of the present disclosure.

FIG. 3B is a front view of the nozzle of FIG. 3A.

DETAILED DESCRIPTION

Figure 1:
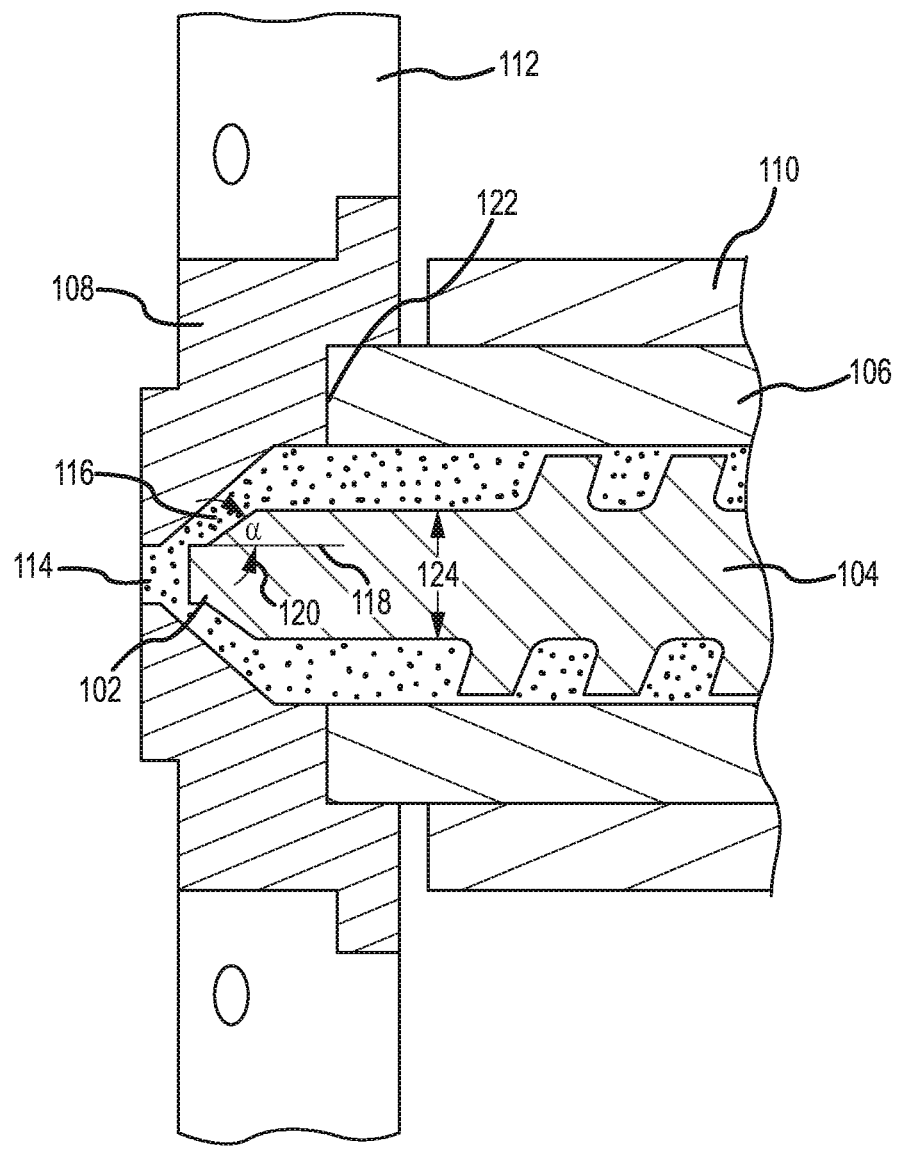
FIG. 1 is a sectional view of an extrusion-to-fill (ETF) injection molding system with a screw tip for shutting off or closing a nozzle that fits into a mold in accordance with embodiments of the present disclosure.

The present disclosure may be understood by reference to the following detailed description, taken in conjunction with the drawings as described below. It is noted that, for purposes of illustrative clarity, certain elements in various drawings may not be drawn to scale.

The present disclosure generally provides a screw tip configured to shut off or close a nozzle for an injection molding apparatus, machine, or system, which may be referred to herein as an extrusion-to-fill (ETF) injection molding system. The screw tip aids in more efficient injection for the ETF injection molding system because there is no cold slug to be dislodged at high pressure like the traditional injection molding system. The ETF injection molding system uses the screw tip to seal the nozzle between molding shots. The nozzle may be opened by separating a tip of an extrusion screw from an opening formed in the nozzle, and the nozzle may be closed by positioning the tip of the extrusion screw in sealed engagement with the nozzle.

The injection molding system may utilize a screw including a screw tip with geometry that matches a nozzle such that material flow is prohibited when the screw tip engages the nozzle and material flows freely when the screw tip is disengaged from the nozzle. In some embodiments, the screw may be reciprocated between an open position in which the screw tip is disengaged from the nozzle and a closed position in which the screw tip is engaged with the nozzle. Rotation of the screw may change its axial position to open and close the nozzle. In other words, a single cylinder or motor may move the screw and advance the screw tip into and out of engagement with the nozzle to prevent or permit, respectively, flow of material into a cavity defined by a mold. In some embodiments, the screw is rotatable but is fixed in an axial direction. In these embodiments, a barrel in which the screw is positioned may be moveable in an axial direction relative to the screw. The nozzle may be attached to the barrel such that movement of the barrel towards the mold seals the nozzle against the mold sprue or inlet, and this movement of the barrel opens the nozzle and permits material to flow from inside the barrel into a mold cavity. The barrel may apply pressure to the nozzle to seal the interface between the nozzle and the mold sprue or inlet. In these embodiments, a motor may be attached to the screw to rotate the screw and a cylinder may be attached to the barrel to move the barrel fore and aft to move the nozzle into and out of contact with the mold sprue or inlet.

The ETF injection molding system facilitates the use of static heat conduction to melt material, such as plastic, as the injection molding system uses lower pressure because there is no cold slug formed between molding shots, which allows for a thinner wall of the barrel. By using static heat conduction to melt material, and the screw tip to seal the nozzle without any cold slug formed between molding shots, the injection molding system may extrude intermittently and on demand under a significantly lower pressure than the traditional injection molding system. Resistance to material flow is a function of the material viscosity, and the static heat conduction of the injection molding system assures a consistent and controlled material temperature and viscosity. In some embodiments, the injection molding system may generate the same pressure as the pressure in the mold cavity or a slightly higher injection pressure, such as 5-10% higher injection pressure, than the pressure in the mold cavity. In some mold applications, the injection molding system may require an injection pressure of only 500 psi to 1500 psi to fill a mold. The temperature and viscosity consistency may result in more uniformly molded part density as well as less warping and part deformation post molding. Generally, a higher injection molding pressure of between 20,000 and 30,000 psi, for example, is required in the traditional system due to non-uniform temperature and viscosity resulting from shear heat generation, and the need to remove the cold slug. This may result in higher density variation and part deformation in molded parts. A large pressure difference in the traditional system may be present between regions near the nozzle and inside the mold cavity and thus may produce parts of less uniformity.

FIG. 1 is a sectional view of an injection molding system, referred to herein as an ETF injection molding apparatus, machine, or system, with a screw tip 102 that is operable to shut off or close a nozzle 108 that fits into a mold 112 in accordance with embodiments of the present disclosure. In FIG. 1, the screw tip 102 is in an open position to let material flow into a mold cavity defined by the mold 112. In the open position of FIG. 1, the screw tip 102 is spaced apart from the nozzle 108 to allow material 116, which may be referred to herein as a resin melt, to flow through an opening 114 formed in the nozzle 108.

In the example illustrated in FIG. 1, the nozzle 108 is formed as a nozzle insert, which fits to the mold 112. In FIG. 1, the nozzle 108 is received at least partially in an entrance or inlet of the mold 112 and engages the mold 112 in a sealed engagement. The nozzle 108 may include a peripheral flange that abuts against the mold 112 when the nozzle 108 is fully inserted into the entrance or inlet defined by the mold 112. The flange may contribute to the sealed engagement between the nozzle 108 and the mold 112. Referring still to FIG. 1, the opening 114 is formed in the nozzle 108 and provides a passage for injecting the material 116 from within a barrel 106 of the injection molding system into a mold cavity defined by the mold 112. As illustrated in FIG. 1, when the screw tip 102 is spaced apart from the nozzle 108, a resin melt 116 may flow around the screw tip 102, through the opening 114 of the nozzle 108, and into the mold cavity defined by the mold 112. As further discussed below, flow of the resin melt 116 may be caused by rotation of an extrusion screw 104.

With continued reference to FIG. 1, the extrusion screw 104 may be positioned inside the barrel 106. The extrusion screw 104 may include the screw tip 102, which is configured or shaped to match the geometry of the nozzle 108 near the opening 114. The extrusion screw 104 is placed inside the barrel 106 and may rotate inside the barrel 106 in two directions, e.g. clockwise and counter-clockwise. In some embodiments, the extrusion screw 104 may move axially along axis 118 forward toward the opening 114 and move axially backward away from the opening 114 of the nozzle 108. As illustrated in FIG. 1, the end 122 of the barrel 106 may fit inside the nozzle 108. In the illustrated embodiment, a heater 110 is attached to the outer surface of the barrel 106. In this embodiment, the heater 110 is outside the mold 112. In some embodiments, the heater may extend to the end 122 of the barrel 106 and may fit inside the nozzle 108 (see FIG. 6).

As shown in FIG. 1, the screw tip 102 is spaced from the nozzle 108 at a distance from the opening 114 of the nozzle 108, which is an open position to allow the material 116 to flow into a cavity defined by the mold 112 through the opening 114. The screw tip 102 of the illustrated embodiment includes an angled transition portion to help material flow. The angled transition portion may be formed at an angle α, identified by arrows 120 in FIG. 1, relative to a longitudinal axis of the extrusion screw 104, such as the axis 118. The angle α may vary depending on the mold application. In some embodiments, the angle α may be between 15° and 45°. Smaller angles may help the material 116 flow better, but would increase the length of the angled portion of the screw tip 102. Preferably, the angle α may be between 20° and 40°, and more preferably between 25° and 35°.

The screw tip 102 may extend axially into the nozzle 108 and fit precisely inside the nozzle 108 to seal the nozzle 108 and close the opening 114, thereby restricting the material 116 from flowing through the opening 114. In some embodiments, the screw tip 102 moves along the axis 118 toward the opening 114. The screw tip 102 can seal the opening 114 of the nozzle 108 to prevent additional resin melt 116 from entering the mold 112. The screw tip 102 may displace the resin melt 116 that would normally form a cold slug prior to the recovery extrusion stage of the traditional injection molding process.

As an example for the dimension of the screw tip, the screw tip 102 may move away at a distance from the nozzle to allow material flow into the mold cavity of the mold 112. For example, the distance may be about 0.25 inches. The opening may be proportional to the screw root diameter. The opening 114 may be 0.25 inches in diameter, while the extrusion screw 104 may have an inner diameter 124 of 0.5 inches. The barrel 106 may have an inner diameter of 0.75 inches and an outer diameter of 1.0 inches. The angle α of the tip from the axial direction may be about 30°. It will be appreciated by those skilled in the art that the dimensions and shapes of the nozzle insert, barrel, and screw may vary.

A support, such as a cylinder (not shown), may be placed at a back end of the extrusion screw 104, opposite to a front end where the screw tip 102 is located. When an injection cycle begins, the support may be released from the back end of the extrusion screw 104 to allow the extrusion screw 104 to move backward. When the extrusion screw 104 begins to rotate, the screw tip 102 may immediately move backward axially to open the nozzle 108 such that the resin melt 116 can be injected or pumped into the mold 112 through opening 114.

When the injection cycle is completed, e.g. the mold 112 is filled, the extrusion screw 104 reverses its rotation to move the screw 104 forward axially until the screw tip 102 closes or shuts off the nozzle 108. The support or cylinder may be activated to move forward during the screw reversal to ensure the shut-off or seal of the nozzle 108.

In addition or alternative to axial movement of the screw tip 102 relative to the nozzle 108 to open or close the opening 114 of the nozzle 108, the nozzle 108 may be moved axially relative to the screw tip 102 to open or close the opening 114 of the nozzle 108. In some embodiments, the barrel 106 is attached to the nozzle 108 and the barrel 106 is axially moveable along the axis 118 relative to the screw tip 102, thereby causing the nozzle 108 to move relative to the screw tip 102. From a closed position, the barrel 102 may be moved forward relative to the screw tip 102, causing the nozzle 108 to move away from the screw tip 102 and open the opening 114 of the nozzle 108 to allow material 116 to flow through the opening 114 and into a cavity defined by the mold 112. From this open position, the barrel 102 may be moved rearward relative to the screw tip 102, causing the nozzle 108 to move into engagement with the screw tip 102 and close the opening 114 of the nozzle 108 to prevent material 116 from flowing through the opening 114. The barrel 106 may be operably coupled to a cylinder that moves the barrel 106 between open and closed positions and asserts pressure on the barrel 106 to seal the nozzle 108 against the mold 112 when the barrel 106 is in the open position. The cylinder may reciprocate the barrel 106, and thus the nozzle 108, between the open and closed positions. In some embodiments, the screw 104 is fixed axially, and the screw 104 rotates within the barrel 106 when the barrel 106 is in the open position to pump the material 116 through the opening 114 of the nozzle 108 into a cavity defined by the mold 112.

In some embodiments, the screw tip 102 may be a separate component from the extrusion screw 104. FIG. 2 is a perspective view of the screw tip in accordance with embodiments of the present disclosure. As shown, a screw tip 200 includes a screw tip portion 202 that matches to the opening 114 of the nozzle 108. The screw tip portion 202 may be in a form of a disk or a plate of any shape, including circular, square, rectangular, and oval, among others. The screw tip 200 may include a non-threaded cylindrical portion 206. The screw tip 200 may include an angled transition portion 204 connecting the screw tip portion 202 to the cylindrical portion 206. The angled transition portion 204 may have an angle β between 15° and 45°. Smaller angles may help the material flow better, but increase the tip dimension. Preferably, the angle β may be between 20° and 40°, more preferably between 25° and 35°.

The screw tip 200 may be attached to the extrusion screw 104 in various manners, including a threaded engagement, a pinned engagement, or a snap-fit engagement, among others. As an example, the screw tip 200 may include a threaded cylindrical portion 210 with outer threads matched to inner threads of the extrusion screw 104 near the end of the screw 104, such that the screw tip 200 can be attached to the end of the extrusion screw 104. The screw tip 200 may include a middle flange portion 208 between the non-threaded cylindrical portion 206 and the threaded cylindrical portion 210. The middle flange portion 208 may extend radially from the non-threaded cylindrical portion 206 and the threaded cylindrical portion 210 to position the screw tip 200 properly onto the extrusion screw 104.

Figure 3C:
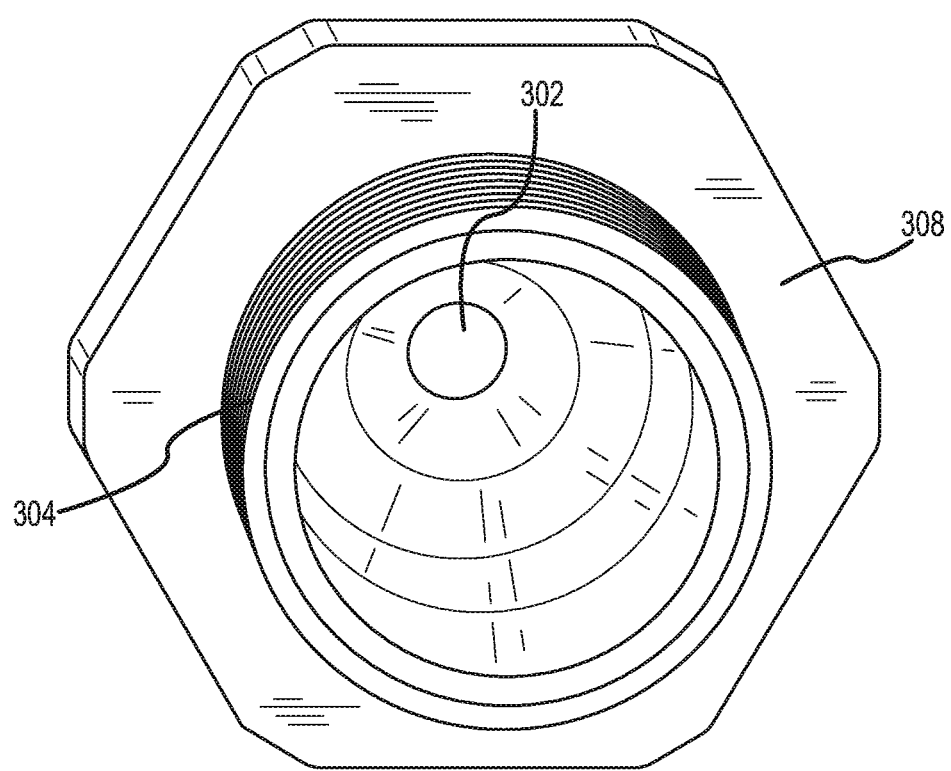
FIG. 3C is a back perspective view of the nozzle of FIG. 3A.

The screw tip 200 may be configured to fit into a nozzle 300 as shown in FIGS. 3A-3C. FIG. 3A is a front perspective view of a nozzle in accordance with embodiments of the present disclosure. FIG. 3B is a front view of the nozzle of FIG. 3A. FIG. 3C is a back perspective view of the nozzle of FIG. 3A. The nozzle 300 may include a nozzle tip portion 306 with an opening 302, which allows a material to be injected into a mold. The opening 302 may be in a circular shape as shown or any other shape.

The nozzle 300 may be attached to a barrel (e.g., barrel 402 in FIG. 4) in various manners, including a threaded engagement, a pinned engagement, a snap-fit engagement, among others. As an example, the nozzle 300 may include a threaded barrel portion 304 with outer threads matched to inner threads of a barrel near an end of the barrel, such that the nozzle 300 may be attached to the end of the barrel (e.g., barrel 402 in FIG. 4). The nozzle 300 may include a flange portion 308 connecting, and positioned between, the tip portion 306 and the threaded barrel portion 304. The flange portion 308 and the tip portion 306 may be configured to fit into a mold.

Figure 4:
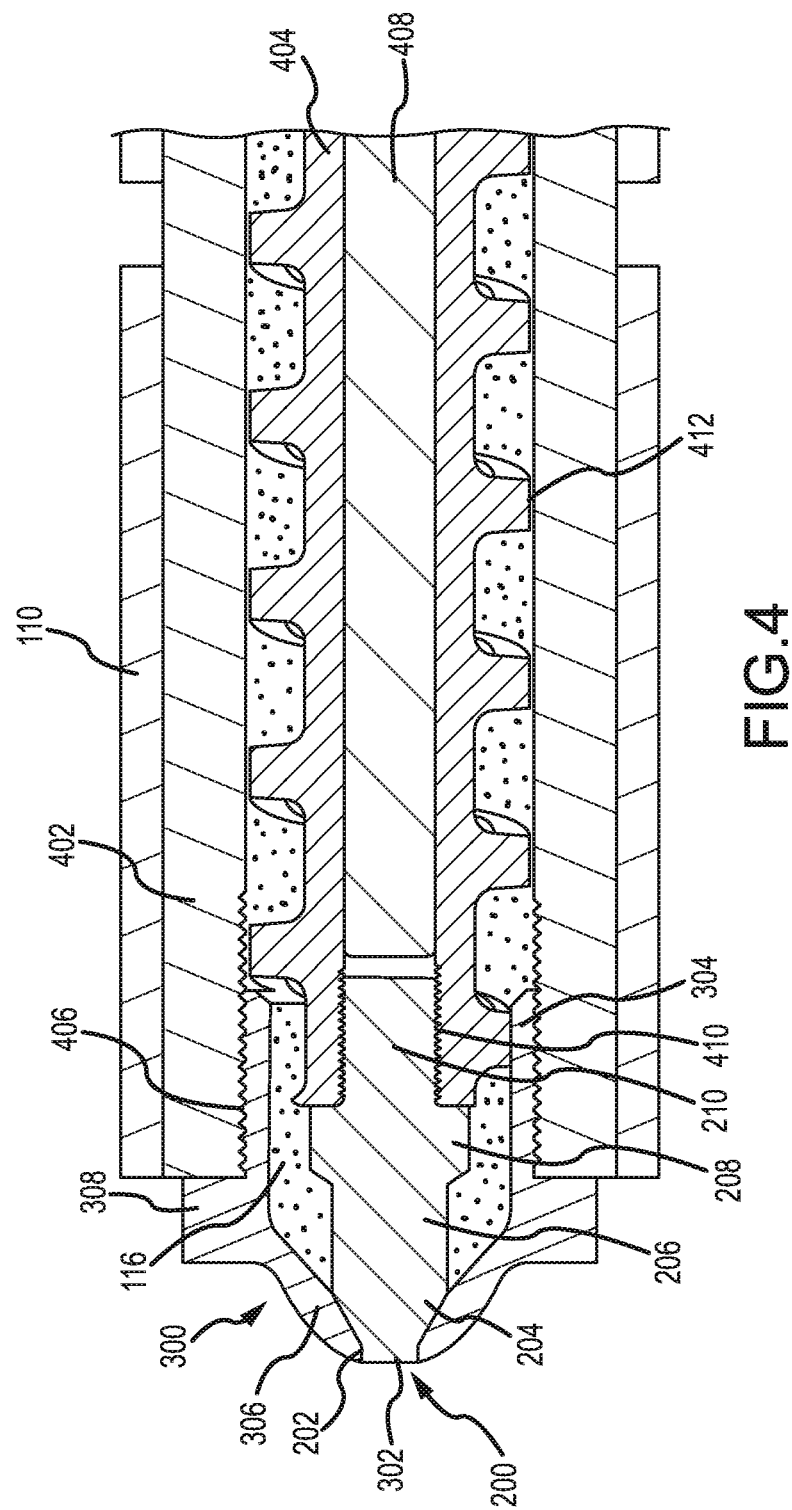
FIG. 4 is a sectional view of the screw tip of FIG. 2 shutting off or closing the nozzle of FIGS. 3A-3C in accordance with embodiments of the present disclosure.

FIG. 4 is a sectional view of the screw tip 200 of FIG. 2 shutting off or closing the nozzle 300 of FIGS. 3A-3C in accordance with embodiments of the present disclosure. FIG. 4 shows that the screw tip is placed at a position to close the opening 302 of the nozzle 300. As shown, one end of the screw tip 200 is attached to the extrusion screw 404 by fastening the outer threads of the threaded cylindrical portion 210 of the screw tip 200 to the inner threads 410 of the extrusion screw 404 at an end of the screw 404. In the illustrated embodiment, the middle flange portion 208 of the screw tip 200 is abutted against the end of the extrusion screw 404.

The screw tip portion 202 may be shaped to match the geometry of the opening 302 while the transition portion 204 of the screw tip 200 may be shaped to match the geometry of the inner surface of the side wall of the nozzle tip portion 306, such that the screw tip 200 can seal the opening 302 of the nozzle 300. As shown in FIG. 4, the resin melt 116 is pushed away from the opening 302 of the nozzle 300 by the tip portion 202 and the transition portion 204 of the screw tip 200.

Referring still to FIG. 4, the nozzle 300 may be attached to an end of the barrel 402 in various manners. For example, the nozzle 300 may be attached to an end of the barrel 402 by fastening the outer threads of the threaded portion 304 of the nozzle 300 to the inner threads 406 of the barrel 402 near the end of the barrel 402. The flange portion 308 of the nozzle 300 is against the end of the barrel 402.

As illustrated in FIG. 4, a small clearance 412 may exist between the barrel 402 and the extrusion screw 404. The clearance 412 may facilitate the extrusion screw 404 to rotate freely within the barrel 402. The clearance 412 may be large enough to largely or substantially prevent material 116 from being sheared between the barrel 402 and the extrusion screw 404.

In some embodiments, the extrusion screw 404 may rotate and move backward a small axial distance to open the nozzle 300. The extrusion screw 404 may rotate reversely to move forward the small axial distance to close or shut off the nozzle 300 when the extrusion cycle is halted by the mold 112 being filled of material, such as a plastic or any other material. In addition or alternative to axial movement of the extrusion screw 404, the barrel 402 may move forward an axial distance relative to the screw 404 to open the nozzle 300 and may move backward or rearward an axial distance relative to the screw 404 to close the nozzle 300.

With continued reference to FIG. 4, band heaters 110, such as electrical heaters, may be placed outside the barrel 402 to heat the material or resin 116. The extrusion screw 404 may be hollow inside, such that a resistor heater 408 or other heat source may be placed inside the extrusion screw 404 to further heat the resin 116. The extrusion screw 404 may be formed of a highly conductive material, like brass, to enhance the heat conduction.

In some embodiments, inductive heat conduction may be possible by using a magnetic barrel or magnetic screw. Induction heat generators may be used to facilitate quicker response time than electric heaters. For example, the ETF injection system may use an induction heat generator along with a magnetic barrel section and/or a magnetic screw to instantly heat the barrel and the extrusion screw. In some embodiments, the barrel and/or extrusion screw may include at least a magnetic portion or section to further facilitate quicker response time.

The ETF injection molding system is less sensitive to material purity level, material cleanliness, contaminants, resin grades, or unknown sources than the traditional system. The materials for molding may include any amorphous thermoplastics, crystalline and semi-crystalline thermoplastics, virgin resins, fiber reinforced plastics, recycled thermoplastics, post-industrial recycled resins, post-consumer recycled resins, mixed and comingled thermoplastic resins, organic resins, organic food compounds, carbohydrate based resins, sugar-based compounds, gelatin//propylene glycol compounds, starch based compounds, and metal injection molding (MIM) feedstocks, among others. The material may be in form of pellets, flakes, or any irregular shapes. For example, mixed and comingled thermoplastic scrap materials that currently would be disposed of as landfill waste may be used for the ETF injection molding.

The nozzle fits between a mold and a barrel for injection molding. In some embodiments, the nozzle may be a single component or piece as shown in FIG. 1. In some embodiments, the nozzle may be an assembled part from a few individual components, because it may be easier to fabricate the individual components. The nozzle may be formed from various materials. In some embodiments, the nozzle is formed from a metal.

Figure 5:
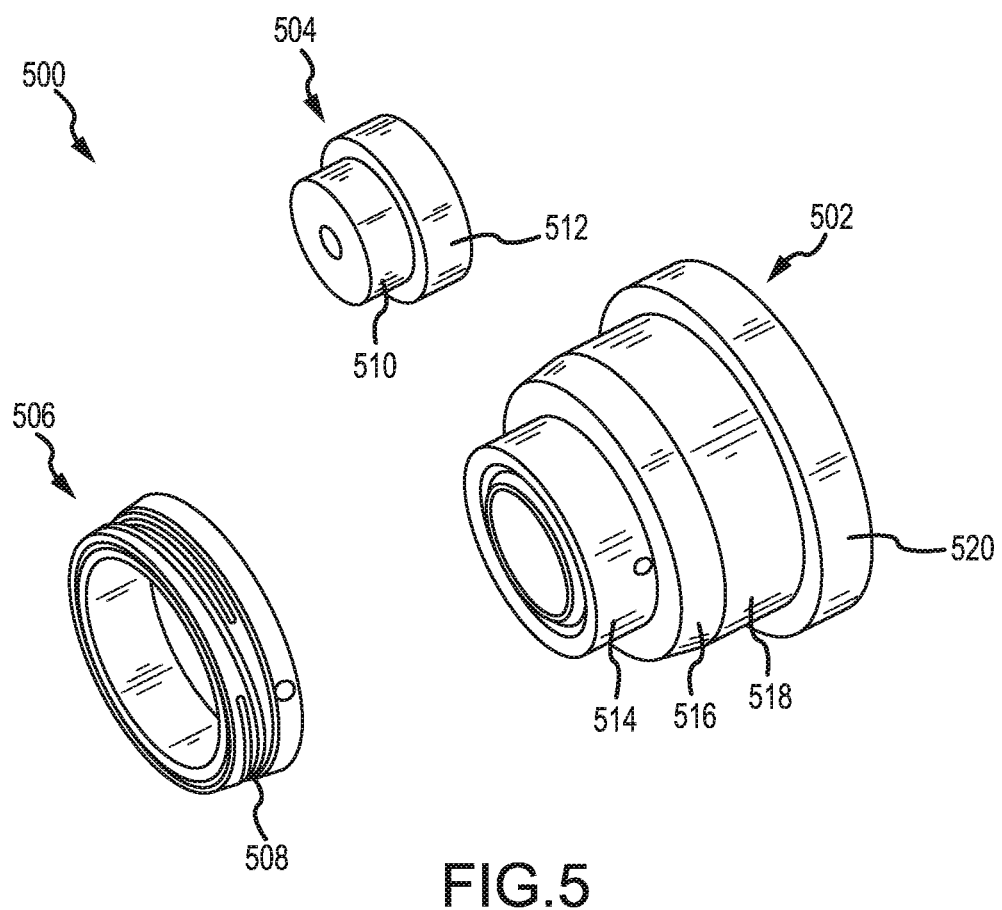
FIG. 5 is a perspective view of a nozzle prior to assembly in accordance with embodiments of the present disclosure.

FIG. 5 is a perspective view of a nozzle prior to assembly in accordance with embodiments of the present disclosure. A nozzle 500, which may be integrated into a mold and referred to herein as a nozzle insert, may include a mold gate 504, which is an entrance for injecting the material into a mold. The mold gate 504 may be formed in a barrel shape having a first barrel portion 510 with a smaller diameter than a second barrel portion 512. The nozzle 500 may include a mold thread 506, which may be referred to herein as a mold insert. The mold thread 506 may enclose the mold gate 504 and may be attached to the mold.

Figure 6:
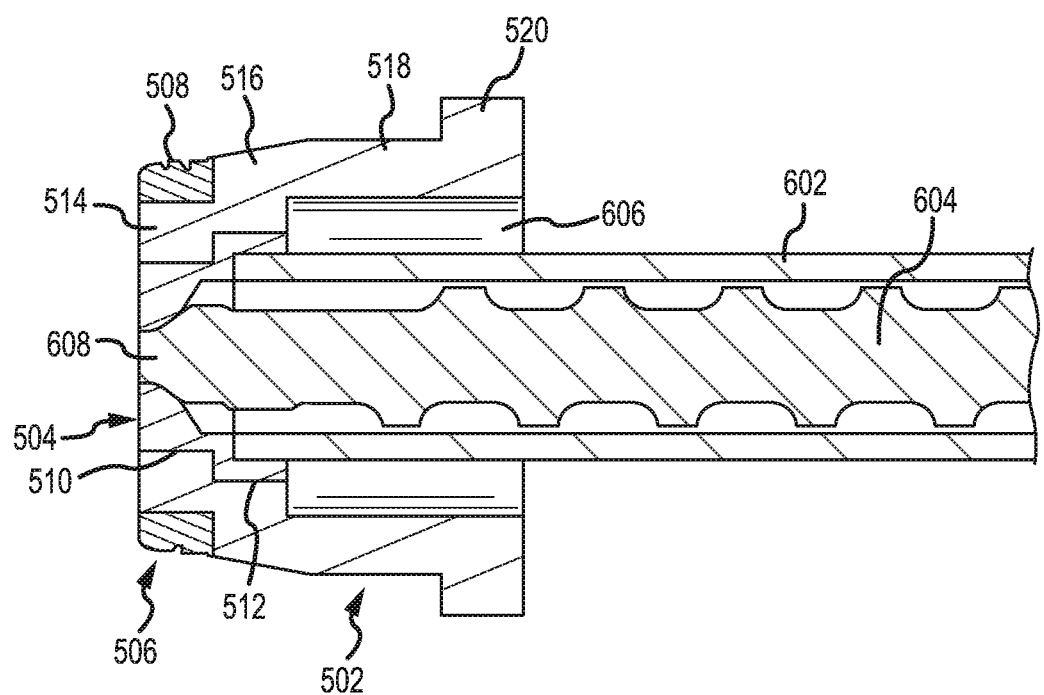
FIG. 6 is a sectional view of the assembled screw tip of FIG. 2 with the nozzle of FIG. 5.

The nozzle 500 may include a mold core or mold core assembly 502, which may be formed in a barrel or tubular shape with various portions of different inner and outer dimensions. The mold core assembly 502 may enclose the mold gate 504 and may be positioned between the mold gate 504 and the mold thread 506, as illustrated in FIG. 6.

The mold core assembly 502 may include a first end portion 514 that has an inner diameter larger than the outer diameter of the mold gate 504 and an outer diameter smaller than the inner diameter of the mold thread 506. As illustrated in FIG. 6, the mold thread 506 may be placed outside or surround the first end portion 514 of the mold core assembly 502. The mold thread 506 may be configured to attach to a mold. As illustrated in FIG. 6, the mold gate 504 may be placed inside the mold core assembly 502.

The mold core assembly 502 may include a second end portion 520 with a larger outer dimension or diameter, such that the second end portion 520 may act as a stopper when the nozzle 500 is placed into the mold. The second end portion 520 may be placed against the mold for molding.

The mold core assembly 502 may include a first middle transition portion 516 that has an inner diameter close to the outer diameter of the second barrel portion 512 of the mold gate 504 to surround the mold gate 504. As illustrated in FIG. 6, the first barrel portion 510 of the mold gate 504 may be positioned inside the first end portion 514 of the mold core assembly 502, and the second barrel portion 512 of the mold gate 504 may be positioned inside the first middle transition portion 516 of the mold core assembly 502. The second barrel portion 512 of the mold gate 504 may abut against the first end portion 514 of the mold core assembly 502 when the mold gate 504 is seated inside the mold core assembly 502. As illustrated in FIG. 6, the mold thread 508 may be surround the first end portion 514 of the mold core assembly 502 and may abut against the first middle transition portion 516 of the mold core assembly 502 when the mold core assembly 502 is inserted into the mold thread 508. The first middle transition portion 516 may have an angled outer surface to form a smooth transition from the mold thread 508 to a second middle transition portion 518 of the mold core assembly 502.

In some embodiments, the screw tip 102 may be integrated with the extrusion screw 104 as a single component. FIG. 6 is a sectional view of the assembled screw tip of FIG. 2 and the nozzle 500 of FIG. 5 sealed by the screw tip. In the embodiment illustrated in FIG. 6, the screw tip is not a separate component from the extrusion screw 604, which is different from the embodiment in FIG. 4. The extrusion screw 604 may be a solid piece such that the extrusion screw 604 does not contain a heater inside the extrusion screw 604, which is an alternative embodiment from that shown in FIG. 4.

As shown in FIG. 6, the first barrel portion 510 of the mold gate 504 may be configured to enclose a tip portion 608 of the extrusion screw 604 inside a barrel 602. The second barrel portion 512 of the mold gate 504 may have a larger dimension than the first barrel portion 510 to partially enclose the extrusion screw 604.

The mold core assembly 502 may enclose a heater 606 outside the barrel 602 as shown in FIG. 6, which is different from the embodiment shown in FIG. 1. The second end portion 520 of the mold core assembly 502 may have an inner diameter larger than the band heater 606 to enclose the band heater 606. The second middle transition portion 518 of the mold core assembly 502 may have a larger inner dimension or diameter than the first middle transition portion 516 of the mold core assembly 502 to enclose the heater 602.

Figure 7A:
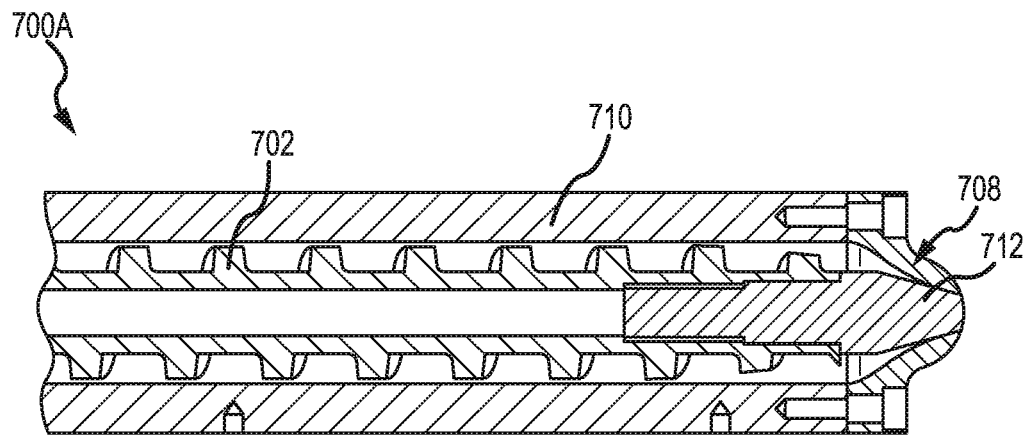
FIG. 7A shows the nozzle in a closed position in accordance with embodiments of the present disclosure.

FIG. 7A shows a nozzle 708 in a closed position 700A in which a screw tip 712 closes or shuts off the nozzle 708. As previously discussed, to close the nozzle 708, an extrusion screw 702 may be moved forward toward the nozzle 708. When the screw 702 moves forward, the screw tip 712 fits into the side wall of the nozzle 708, which seals the molten material from flowing into the mold and also prevents the formation of a cold slug. Alternatively, to close the nozzle 708, a barrel 710 may be moved rearward relative to the screw 702, causing the nozzle 708 which is attached to the barrel 710 to move towards the screw tip 712 and engage the screw tip 712 to seal the molten material from flowing through the nozzle 708.

Figure 7B:
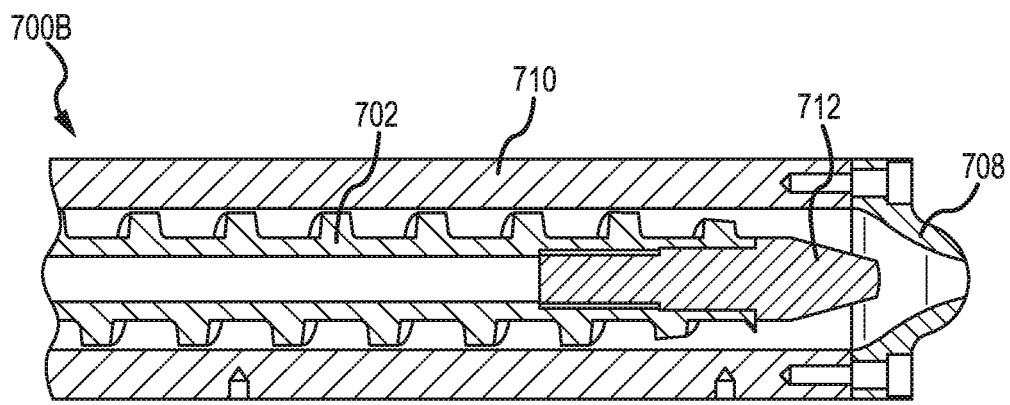
FIG. 7B shows the nozzle of FIG. 7A in an open position in accordance with embodiments of the present disclosure.

FIG. 7B shows the nozzle 708 in an open position 700B. As previously discussed, to open the nozzle 708, the extrusion screw 702 may be moved backward away from the nozzle 708. A support (not shown), such as a small cylinder behind the extrusion screw 702, may be released when injection molding commences. When the extrusion screw 702 initially rotates to advance material inside a barrel 710, the screw tip 712 may move backward a small distance from the nozzle 708, thereby opening the nozzle 708. With the nozzle 708 in the open position 700B, the extrusion screw 702 rotates within the barrel 710 to pump the material into the mold until the mold is filled. In other words, the shot size is not limited by a fixed stroke like in traditional injection molding systems. The present ETF injection system can extrude plastic continuously to fill a mold cavity of any size.

When the mold cavity is filled, the screw rotation may be reversed to move the screw 702 forward to place the screw tip 712 against the nozzle 708, which decompresses the barrel 710 and the material within the barrel 710. Simultaneously, a cylinder associated with the screw 702 may apply pressure to the back of the extrusion screw 702 to assure that the screw tip 712 seats properly inside the nozzle 708. Alternatively, to open the nozzle 708, the barrel 710 may be moved forward relative to the screw 702, causing the nozzle 708 to move away from and disengage the screw tip 712, and thereby permitting molten material to flow from inside the barrel 710, through the nozzle 708, and into a mold against which the nozzle 708 is placed.

To prepare for molding a part by using the ETF injection molding system, the extrusion screw and/or the barrel may be moved to place the nozzle against a gate of a mold. The hopper may be filled with a material to be molded. The material may be in forms of pellets or flakes or any irregular shapes. The hopper may be cooled by water or other coolants. One or more heaters may be turned on to melt the material as it is filled in the barrel from the hopper. The material is between the inner surface of the barrel and the outer surface of the extrusion screw as shown in FIGS. 1 and 6.

Figure 8:
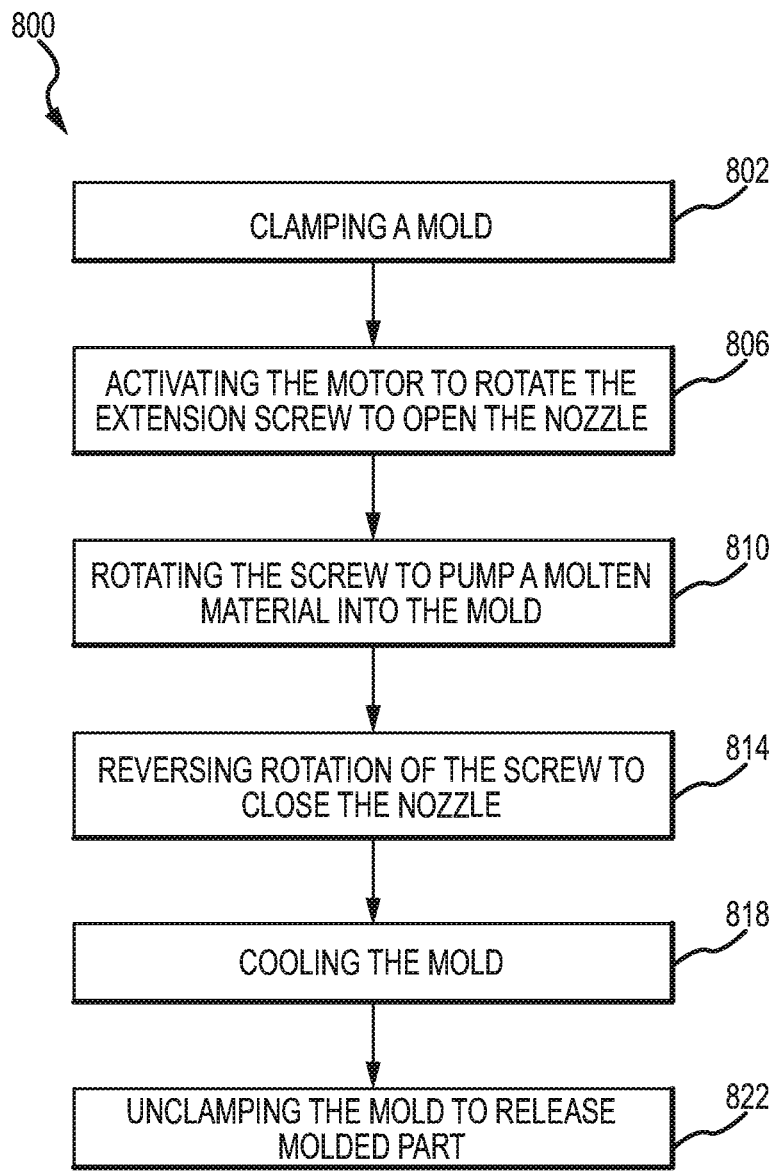
FIG. 8 is a flow chart illustrating steps for molding a part by using an ETF injection molding system in accordance with embodiments of the present disclosure.

FIG. 8 is a flow chart illustrating steps for molding a part by using an ETF injection molding system in accordance with embodiments of the present disclosure. Method 800 may include clamping a mold at operation 802. The clamping may be achieved in various manners, which may include, but are not limited to, applying a pneumatic clamping force (e.g., an air pressure based actuation system), a mechanical clamping force (e.g., a mechanical clamp), and/or an electrical clamping force (e.g., a servomotor-based actuation system) at operation 802. In embodiments using air pressure, the air pressure may vary depending on the size of the mold. In some embodiments, the injection molding system may generate the same pressure as the pressure in the mold cavity or a slightly higher injection pressure, such as 5-10% higher injection pressure, than the pressure in the mold cavity. In some embodiments, the air pressure may range from 90 psi to 110 psi. The mold may be formed of various materials, including a metal such as aluminum or steel. Because of the low pressure used in the extrusion, an aluminum mold can be used for the ETF injection molding system. For the traditional injection molding system, steel molds are typically used due to the high pressure required for extrusion.

Method 800 continues with activating a motor to rotate the extrusion screw to open the nozzle at operation 806. Alternatively, as previously discussed, the nozzle may be opened by moving the barrel relative to the screw. The motor may be coupled to an end of the extrusion screw to rotate the extrusion screw in one direction, either clockwise or counter-clockwise, depending upon the screw design. Method 800 may include rotating the extrusion screw to pump a molten material into the mold at operation 810. When the mold is filled, the motor may reverse the screw rotation to move the screw tip forward to close the nozzle at operation 814. Alternatively, as previously discussed, the nozzle may be closed by moving the barrel relative to the screw. The molten material may take time to cool in the mold at operation 818. The time may vary, such as cooling within a few seconds for example. After cooling, the mold may be unclamped such that a part can be released at operation 822. The mold may be unclamped in various manners, which may include releasing an air pressure applied to the mold.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention. All of the features disclosed can be used separately or in various combinations with each other.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A method of molding a part, comprising:
   rotating a screw within a barrel to extrude a molten material through a nozzle opening of a nozzle into a mold cavity; and
   after extruding the molten material through the nozzle opening, inserting a free end of the screw that is defined by a cylindrical tip portion and corresponding in geometry to the nozzle opening into the nozzle opening along an entire axial length of the nozzle opening to displace all of the molten material from the nozzle opening, wherein the cylindrical tip portion rotates with the screw, and wherein the cylindrical tip portion comprises a consistent circular cross-section extending along a longitudinal axis of the screw.

2. The method of claim 1, wherein inserting the tip portion of the screw into the nozzle opening comprises inserting the tip portion of the screw into the nozzle opening until the tip portion of the screw is substantially flush with an exterior surface of the nozzle.

3. The method of claim 1, wherein inserting the tip portion of the screw into the nozzle opening comprises sealingly engaging the tip portion of the screw with the nozzle along the entire axial length of the nozzle opening.

4. The method of claim 1, wherein rotating the screw within the barrel causes the molten material to flow around the tip portion of the screw, through the nozzle opening, and into the mold cavity.

5. The method of claim 1, further comprising sealingly engaging an interior surface of the nozzle with a transition portion of the screw.

6. The method of claim 5, wherein the tip portion of the screw has a smaller axial length than the transition portion of the screw.

7. The method of claim 5, wherein the transition portion of the screw extends outward from the tip portion of the screw.

8. The method of claim 7, wherein the transition portion of the screw extends rearward from the tip portion of the screw.

9. A method of molding a part, comprising:
   injecting a molten material through a nozzle opening of a nozzle into a mold cavity; and
   after injecting the molten material through the nozzle opening, inserting a cylindrical tip of a screw that is positioned at a distal end of the screw and corresponding in geometry to the nozzle opening into the nozzle opening along an entire axial length of the nozzle opening to displace all of the molten material from the nozzle opening, wherein the cylindrical tip rotates with the screw, and wherein the cylindrical tip comprises a consistent circular cross-section extending along a longitudinal axis of the screw.

10. The method of claim 9, wherein injecting the molten material through the nozzle opening comprises rotating the screw within the barrel.

11. The method of claim 10, wherein rotating the screw within the barrel causes the molten material to flow around the tip of the screw, through the nozzle opening, and into the mold cavity.

12. The method of claim 9, wherein inserting the tip of the screw into the nozzle opening comprises inserting the tip of the screw into the nozzle opening until the tip of the screw is substantially flush with an exterior surface of the nozzle.

13. The method of claim 9, wherein inserting the tip of the screw into the nozzle opening comprises inserting the tip of the screw through the nozzle opening such that the tip of the screw seals the nozzle opening along the entire axial length of the nozzle opening.

14. The method of claim 9, wherein inserting the tip of the screw into the nozzle opening comprises sealingly engaging the tip of the screw with the nozzle along the entire axial length of the nozzle opening.

15. The method of claim 9, further comprising sealingly engaging an interior surface of the nozzle with a portion of the screw located rearward of the tip of the screw.

16. The method of claim 15, wherein the portion of the screw extends outward from the tip of the screw.

17. The method of claim 15, wherein the tip of the screw has a smaller axial length than the portion of the screw.

18. A method of molding a part, comprising:

rotating a screw within a barrel to pump a molten material through a cylindrical nozzle opening of a nozzle into a mold cavity; and after pumping the molten material through the nozzle opening, inserting a cylindrical tip of the screw corresponding in geometry to the nozzle opening into the nozzle opening along an entire axial length of the nozzle opening to displace all of the molten material from the nozzle opening, the cylindrical tip portion defining a distal end of the screw, wherein the cylindrical tip portion rotates with the screw, and wherein the cylindrical tip portion comprises a consistent circular cross-section extending along a longitudinal axis of the screw.

19. The method of claim 18, wherein the tip of the screw is spaced apart from the nozzle opening while rotating the screw within the barrel to pump the molten material around the tip of the screw, through the nozzle opening, and into the mold cavity.

20. The method of claim 18, wherein inserting the tip of the screw into the nozzle opening comprises inserting the tip of the screw into the nozzle opening until the tip of the screw is substantially flush with an exterior surface of the nozzle.

* * * * *